US 8,164,462 B1

(12) United States Patent
Bose et al.

(10) Patent No.: US 8,164,462 B1
(45) Date of Patent: Apr. 24, 2012

(54) GEESE CHASING SYSTEM

(76) Inventors: Jacqueline Carmela Bose, Lyons, IL (US); August Richard Bose, Lyons, IL (US)

(*) Notice: Subject to any disclaimer, the term of this patent is extended or adjusted under 35 U.S.C. 154(b) by 371 days.

(21) Appl. No.: 12/544,379

(22) Filed: Aug. 20, 2009

(51) Int. Cl.
G08B 23/00 (2006.01)

(52) U.S. Cl. .................. 340/573.1; 119/712; 89/37.01

(58) Field of Classification Search .............. 340/945, 340/981, 982; 89/37.01, 37.19; 119/712, 119/713
See application file for complete search history.

(56) References Cited

U.S. PATENT DOCUMENTS

| | | | |
|---|---|---|---|
| 3,183,480 A | 5/1965 | Adler, Jr. | |
| 4,475,102 A | 10/1984 | Troy et al. | |
| 4,736,907 A * | 4/1988 | Steffen | 244/1 R |
| 4,964,331 A | 10/1990 | Halevy et al. | |
| 5,270,707 A | 12/1993 | Schulte et al. | |
| 5,425,192 A | 6/1995 | Negre | |
| 5,774,088 A * | 6/1998 | Kreithen | 342/22 |
| 6,250,255 B1 | 6/2001 | Lenhardt et al. | |
| 6,940,424 B2 * | 9/2005 | Philiben et al. | 340/945 |
| 7,971,827 B2 * | 7/2011 | Barrientos et al. | 244/121 |

* cited by examiner

*Primary Examiner* — George Bugg
*Assistant Examiner* — Edny Labbees

(57) ABSTRACT

The geese chasing system includes of a housing encasing a visual signaling capability, sensor, and audio signaling capability. A plurality of housings can be installed upon the nose and wings of an aircraft in order to direct more signaling strength as well as to accommodate larger aircraft. The geese chasing system also include a cockpit alarm that provides a manual override as well as an automated signaling capability.

5 Claims, 3 Drawing Sheets

GEESE CHASING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of noise generating systems, more specifically, a noise generating system that scares geese and other birds from an oncoming airplane.

For years, Geese and other birds have been sucked into the inlet portion of jet engines of airplanes, and can result in jet engine failure. A notable occurrence involved an Airbus A320 wherein geese were engulfed in both engines and resulting in a miraculous landing in the Hudson River.

It shall be noted that the population of Geese as well as commercial flight volume have both increased, and thereby increases the chances of such incidents.

As a result of the dangers associated with the engulfment of birds into jet engines there have been varying systems that provide signaling means, which are used to scare off or deflect airplane.

B. Discussion of the Prior Art

As a preliminary note, it should be stated that there is an ample amount of prior art that deals with bird collision avoidance systems. As will be discussed immediately below, no prior art discloses a bird collision avoidance system that uses both visual and non-audible high frequency emissions, which is mounted on both the fuselage and the wings of the aircraft, which includes a cockpit alarm with manual override as well as automated signaling means.

The Schultz et al. Patent (U.S. Pat. No. 5,270,707) discloses a process and an apparatus for the avoidance of bird impacts on airplanes by means of at least one light-flashes generating light source on an airplane. However, the process and apparatus fails to include high frequency sounds that are audible to geese and other birds, but not the human ear.

The Halevy et al. Patent (U.S. Pat. No. 4,964,331) discloses a mobile, radio-controlled airplane that flies around an airport in a random pattern, as controlled by an operator, with a range greater than needed to scare away birds from runways. However, the radio-controlled airplane does not include a system that works with a commercial airplane involving visual and audible emissions that deter geese or other birds away from the general vicinity.

The Steffen Patent (U.S. Pat. No. 4,736,907) discloses a process and apparatus for preventing bird collisions by means of at least one light source installed on an aircraft that produces light flashes. However, the process and apparatus fails to produce high-frequency sounds in addition to any visual effects.

The Troy et al. Patent (U.S. Pat. No. 4,475,102) discloses an apparatus primarily for bird dispersal purposes at an airport having a remote control means provided for controlling operation of one or more sound emitting devices adapted to cause a detonation or emit a detonation-like sound at a required position or positions, e.g., in relation to an airport runway. However, the apparatus is designed to disperse birds via a detonation, and not by ways of a high frequency sound that is inaudible to humans in addition to a visual emission.

The Lenhardt et al. Patent (U.S. Pat. No. 6,250,255) discloses a system and method of alerting and/or repelling birds and other animals that may be used at an airport or on an aircraft. However, the system does not include a visual signal to disperse geese or birds away from the general vicinity in addition to a cockpit alarm that provides manual override in addition to an automated signaling setting.

The Negre Patent (U.S. Pat. No. 5,425,192) discloses an infrared activated electronic dissuasive device for birds. Again, the device does not involve high frequency sound generating means as an additional signaling means that alerts and deters geese and birds, but which is inaudible to humans.

The Kreithen Patent (U.S. Pat. No. 5,774,088) discloses a hazard warning system that radiates pulses of microwave energy to alert and warn target, flying birds of the presence of wind turbine electrical generators, power distribution systems, aircraft, and other protected areas from hazardous intrusion. However, the system does not include a cockpit warning system with manual override in addition to an automated signaling setting.

The Philiben et al. Patent (U.S. Pat. No. 6,940,424) discloses a hazard avoidance system for a vehicle utilizing data related to a location of a collision threat, conditions at the location, and vehicle operating parameters to select a light illumination routine that is optimal to attract the attention of and repel a collision hazard. However, the system does not include a high frequency sound in addition to a visual signal to alert and deter geese and birds from the general vicinity.

The Adler, Jr. Patent (U.S. Pat. No. 3,183,480) discloses a set of rotating anti-collision lights for an aircraft. However, the lights are not used in conjunction with a high frequency sound to chase geese and birds away from an aircraft.

While the above-described devices fulfill their respective and particular objects and requirements, they do not describe a bird collision avoidance system that uses both visual and non-audible high frequency emissions, which is mounted on both the fuselage and the wings of the aircraft, which includes a cockpit alarm with manual override as well as automated signaling means. In this regard, the geese chasing system departs from the conventional concepts and designs of the prior art.

SUMMARY OF THE INVENTION

The geese chasing system includes of a housing encasing a visual signaling means, sensor, and audio signaling means. A plurality of such housings can be installed upon the nose and wings of an aircraft in order to direct more signaling strength as well as to accommodate larger aircraft. The geese chasing system also include a cockpit alarm that provides a manual override as well as an automated signaling means.

It is an object of the invention to provide a geese or bird chasing system that involves both an audio and visual signaling means that are designed to deter geese or birds from the vicinity of the invention.

A further object of the invention is to provide an audio signaling means that uses a high frequency sound that is audible to geese and birds, but inaudible to humans.

It is a further object of the invention to provide a cockpit alarm that provides an automated signaling means via the sensor.

It is a further object of the invention to provide a cockpit alarm that provides a manual override in the event that a pilot has visual confirmation of geese or birds wherein the sensor has failed to sense said objects in order to operate the signaling means provided.

These together with additional objects, features and advantages of the geese chasing system will be readily apparent to those of ordinary skill in the art upon reading the following detailed description of presently preferred, but nonetheless illustrative, embodiments of the geese chasing system when taken in conjunction with the accompanying drawings.

In this respect, before explaining the current embodiments of the geese chasing system in detail, it is to be understood that the geese chasing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the geese chasing system.

It is therefore important that the claims be regarded as including such equivalent construction insofar as they do not depart from the spirit and scope of the geese chasing system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
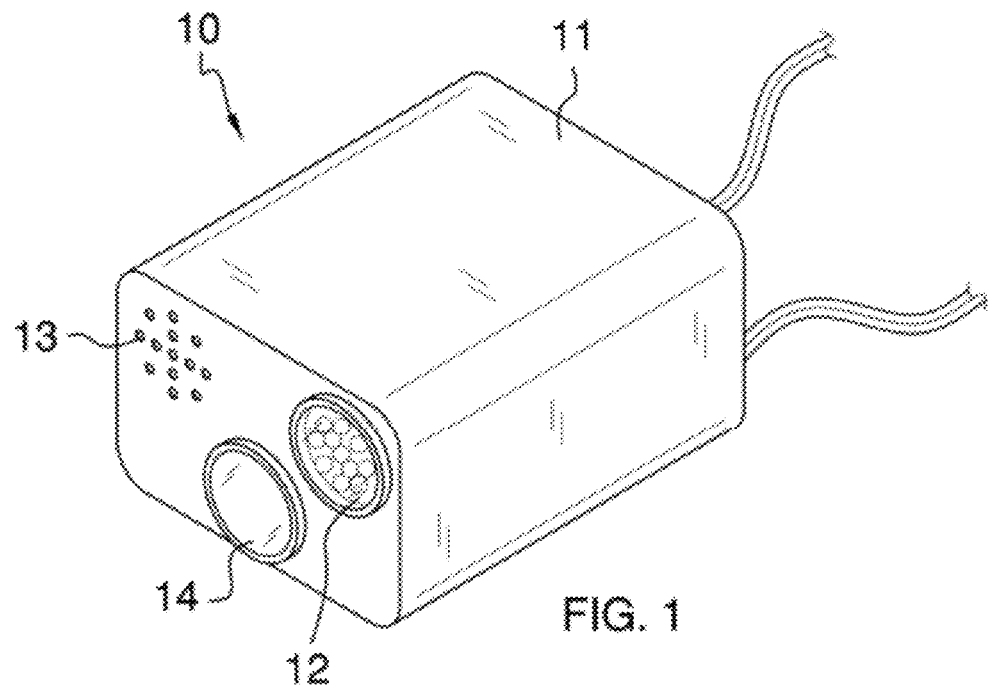
FIG. 1 illustrates a front, isometric view of the geese chaser with details directed to the sensor, visual signaling means, and audio signaling means.
Figure 2:
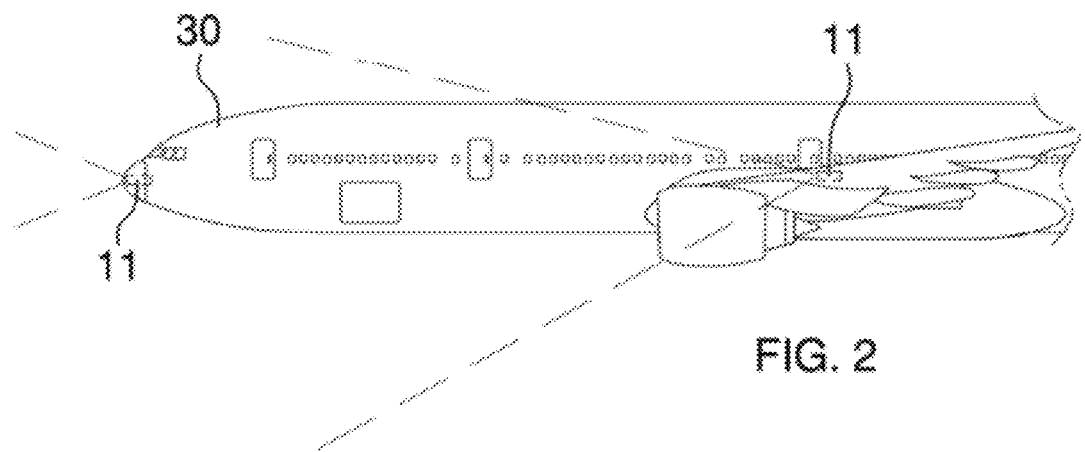
FIG. 2 illustrates a view of the invention installed upon the nose and wings of an aircraft and detailing the projection of the signaling means.
Figure 3:
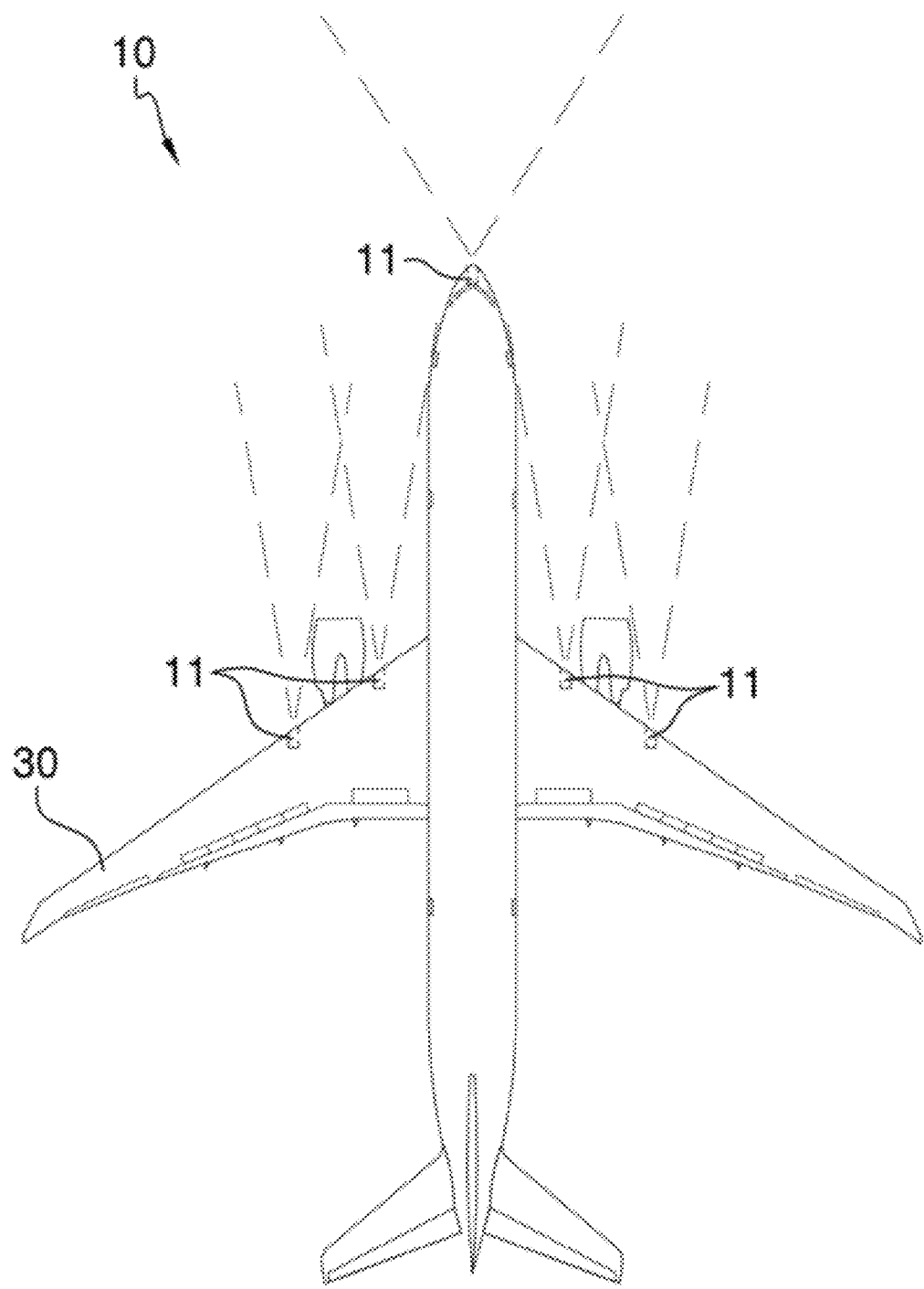
FIG. 3 illustrates a top view of the invention installed upon the nose and wings of an aircraft and detailing the projection of the signaling means.
Figure 4:
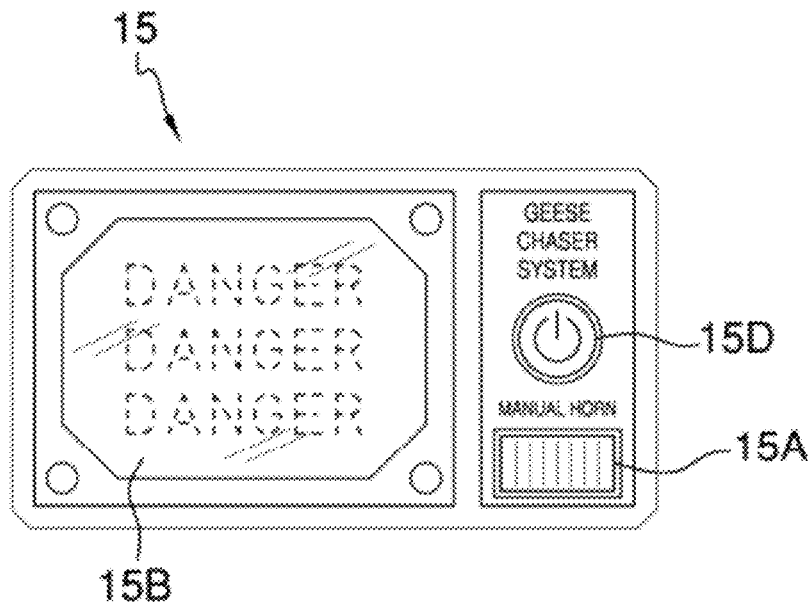
FIG. 4 illustrates a view of the cockpit alarm and controls associated therewith.
Figure 5:
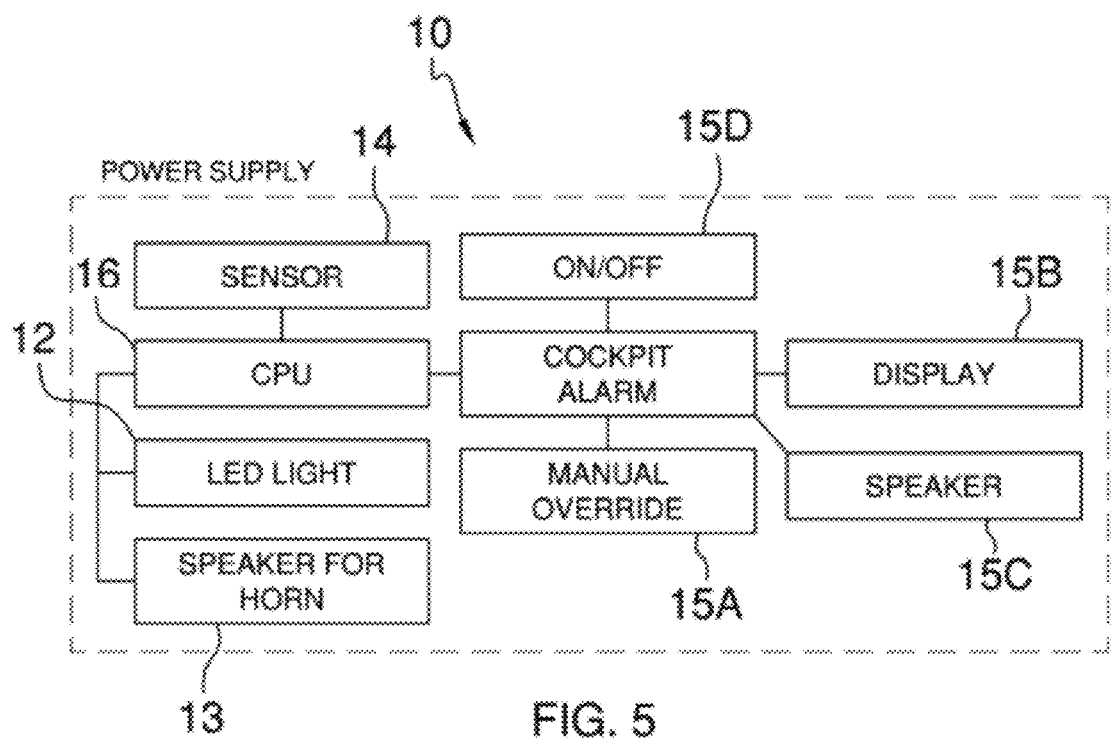
FIG. 5 illustrates a diagram of the various electrical components of the invention.

Detailed reference will now be made to the first embodiment of the present invention, examples of which are illustrated in FIGS. 1-5. A geese chasing system 10 (hereinafter first embodiment) includes a housing 11 containing a visual signaling means 12, an audio signaling means 13, and a sensor 14.

A plurality of such housings are installed along various points of an airplane 30 and direct both the visual signaling means 12 and the audio signaling means 13 in the forward direction of said airplane 30.

The invention 10 also includes a cockpit alarm 15, which includes a manual override 15A, a display 15B, a speaker 15C, and an ON/OFF button 15D.

The visual signaling means 12 includes a plurality of light emitting diodes. The audio signaling means 13 consists of a high frequency sound generating means that is not audible to humans, but is audible to Geese and the avian variety.

The sensor 14 is simply a motion sensor or an infrared sensor that detects either movement or heat signatures of objects such as Geese. The sensor 14 shall have a range adequate to detect the approach of said objects, and enable quick commencement of both the visual signaling means 12 and the audio signaling means 13 via a CPU 16.

In the event that the sensor 14 fails to detect Geese or birds, but are visible by pilots, personnel, etc.; the manual override 15A provides immediate commencement of both the visual signaling means 12 and audio signaling means 13.

With respect to the above description, it is to be realized that the optimum dimensional relationship for the various components of the invention 10 to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A bird signaling system for use with an airplane comprising:
   an audio signaling means, a visual signaling means, and a sensor;
   wherein said sensor detects movements associated with birds, and emits both the audio signaling means and visual signaling means in an effort to deter said birds from flying within the vicinity of the system;
   wherein the audio signaling means includes a high frequency sound generating means that is audible to birds, but inaudible to humans;
   wherein the visual signaling means consists of a plurality of light emitting diodes;
   wherein a plurality of audio signaling means are attached to various parts of said airplane comprising a nose or along a leading edge of the wings of said airplane;
   wherein a plurality of visual signaling means are attached to various parts of said airplane comprising a nose or along a leading edge of the wings of said airplane;
   wherein a cockpit alarming system is included and emits an audible alarm within the cockpit in order to alert personnel therein of detection of birds via the sensor, and emission of both the audio and video signaling means.

2. The bird signaling system as described in claim 1 wherein the cockpit alarming system includes a manual override, which when engaged will commence emission of both the audio and video signaling means.

3. The bird signaling system as described in claim 1 wherein the cockpit alarm includes a display that alerts personnel within said cockpit of commencement of the audio and video signaling means.

4. The bird signaling system as described in claim 1 wherein the cockpit alarm includes a speaker that alerts via an audible alarm to personnel within said cockpit of commencement of the audio and video signaling means.

5. A bird signaling system for use with an airplane comprising:

a plurality of audio signaling means, a plurality of visual signaling means, and a sensor;

wherein the audio signaling means and the visual signaling means are installed upon a plurality of locations on the airplane and direct their respective signaling means in a forward direction of the airplane;

wherein said locations on said airplane further comprise a nose or along a leading edge of the wings of said airplane;

wherein said sensor detects movements associated with birds, and emits both the audio signaling means and visual signaling means in an effort to deter said birds from flying within the vicinity of the system;

wherein the audio signaling means includes a high frequency sound generating means that is audible to birds, but inaudible to humans;

wherein the visual signaling means consists of a plurality of light emitting diodes;

wherein a cockpit alarming system is included and emits an audible alarm within the cockpit in order to alert personnel therein of detection of birds via the sensor, and emission of both the audio and video signaling means;

wherein the cockpit alarming system includes a manual override, which when engaged will commence emission of both the audio and video signaling means;

wherein the cockpit alarm includes a display that alerts personnel within said cockpit of commencement of the audio and video signaling means;

wherein the cockpit alarm includes a speaker that alerts via an audible alarm to personnel within said cockpit of commencement of the audio and video signaling means.

* * * * *